March 28, 1961 T. F. THOMPSON 2,976,964
FIFTH WHEEL MOUNT

Filed July 6, 1959 3 Sheets-Sheet 1

INVENTOR.
THEODORE F. THOMPSON.

BY *McGrew & Edwards*

ATTORNEYS

March 28, 1961  T. F. THOMPSON  2,976,964
FIFTH WHEEL MOUNT

Filed July 6, 1959  3 Sheets-Sheet 2

INVENTOR.
THEODORE F. THOMPSON

ATTORNEYS

March 28, 1961 T. F. THOMPSON 2,976,964
FIFTH WHEEL MOUNT
Filed July 6, 1959 3 Sheets-Sheet 3
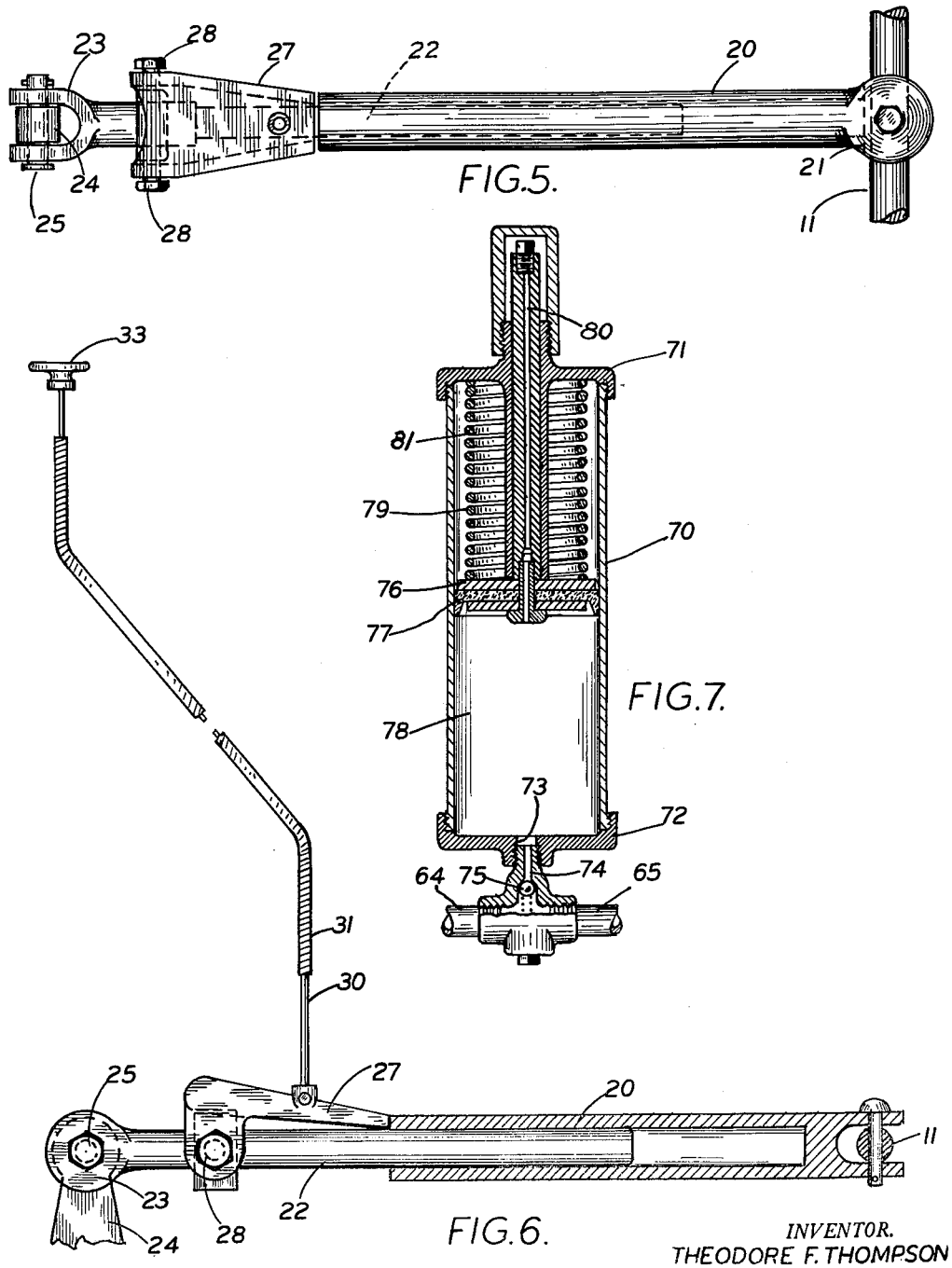

United States Patent Office 2,976,964
Patented Mar. 28, 1961

2,976,964
FIFTH WHEEL MOUNT
Theodore F. Thompson, 409 E. 12th St., Davenport, Iowa Filed July 6, 1959, Ser. No. 825,244

10 Claims. (Cl. 188—112)

This invention relates to vehicle trailer mountings, and more particularly to a mounting arrangement for a truck fifth wheel for a semi-trailer mounting which is arranged to provide automatic braking for an attached trailer.

One type of trailer used in the trucking industry is what is known as a semi-trailer, which is a vehicle partially supported by its own wheels and partially supported by a prime mover. In general, semi-trailers utilize a set of rear wheels and the front of the trailer is supported on a "fifth wheel" mounted on the truck chassis, generally over the rear wheels thereof. The fifth wheel provides pivotal movement of the trailer in relation to the prime mover at the connection point to permit necessary turning movements. Since such trailers are usually large and suited to carry heavy loads, the wheels of the trailer must have a braking system for use in conjunction with the prime mover braking system. The trailer braking system may be controlled independently by the operator or automatically with the prime mover braking system. A common arrangement is to have separate controls for the truck brakes and the trailer brakes, and the skill of the operator is relied on for proper braking action to prevent jackknifing and skidding and to provide proper stopping.

According to the present invention, I have provided a fifth wheel mounting which provides a system for automatic braking of the trailer under certain conditions to prevent overriding by the trailer on the prime mover. The fifth wheel mounting includes a movable support which is arranged to actuate the trailer brakes on certain relative movements between the prime mover and the trailer. Means are also provided to prevent twisting of the movable support so that the movable support moves along a path parallel to the truck frame, thereby providing a smooth braking action in turns, and providing a smooth and uniform pull or push on the fifth wheel mounting.

Included among the objects and advantages of the invention is to provide a mounting for a tractor fifth wheel which is arranged to provide an effective and automatic trailer braking control whereby under certain draft conditions the brakes of an attached trailer are automatically actuated. The mount includes two spaced-apart supports, and includes means for providing a uniform force condition on each of the supports under dynamic conditions and under various angular positions of the trailer with respect to the tractor. The mount is arranged to provide parallel movement along a path and for substantially even distribution of forces on the supports and on the frame of the tractor. The mount provides a cushioning effect between the tractor and the trailer.

Other objects and advantages of the invention may be readily ascertained by referring to the following description and appended illustrations in which:

Fig. 5 is a top plan view of a connecting rod between the fifth wheel arrangement of the invention and a brake actuating system;

Fig. 6 is a side elevational view of the device of Fig. 5; and

Fig. 7 is a side elevational view in cross-section of a reservoir for supplying hydraulic fluid to the cylinders of the fifth wheel mount.

Figure 1:
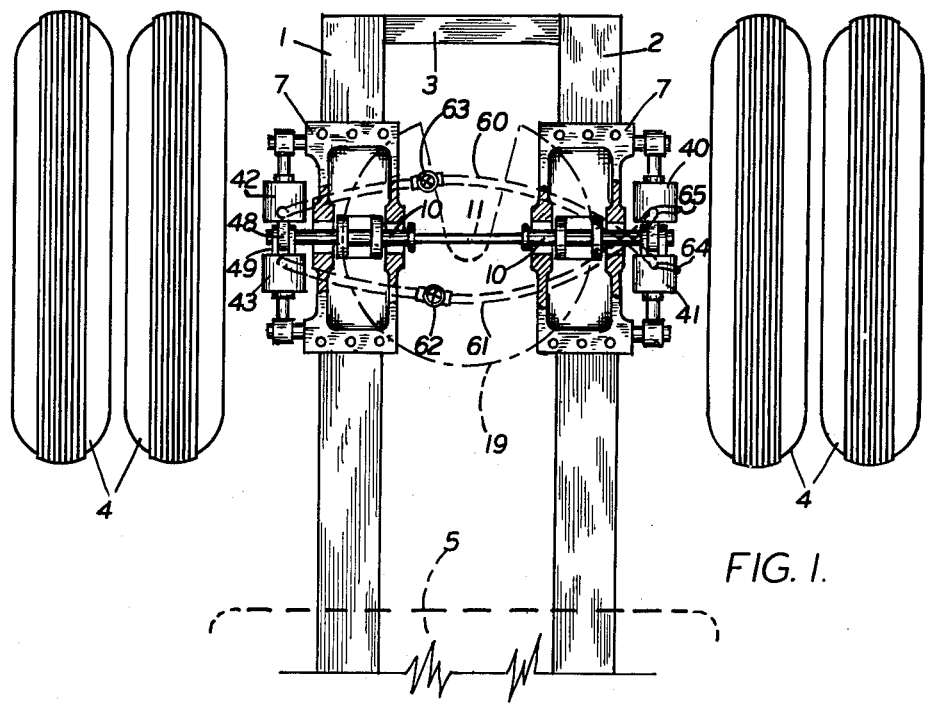
Fig. 1 is a top plan, generally schematic, view of the fifth wheel mount according to the invention illustrating its positioning on a prime mover.
Figure 4:
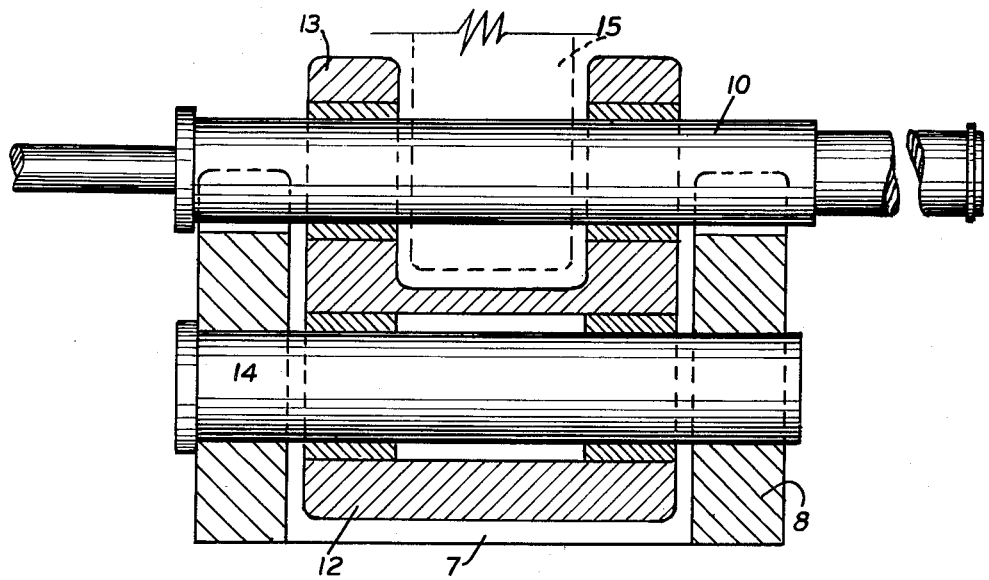
Fig. 4 is a detailed side elevational view, in cross section, of a pivotal mounting system for the fifth wheel mount of Fig. 2.
Figure 2:
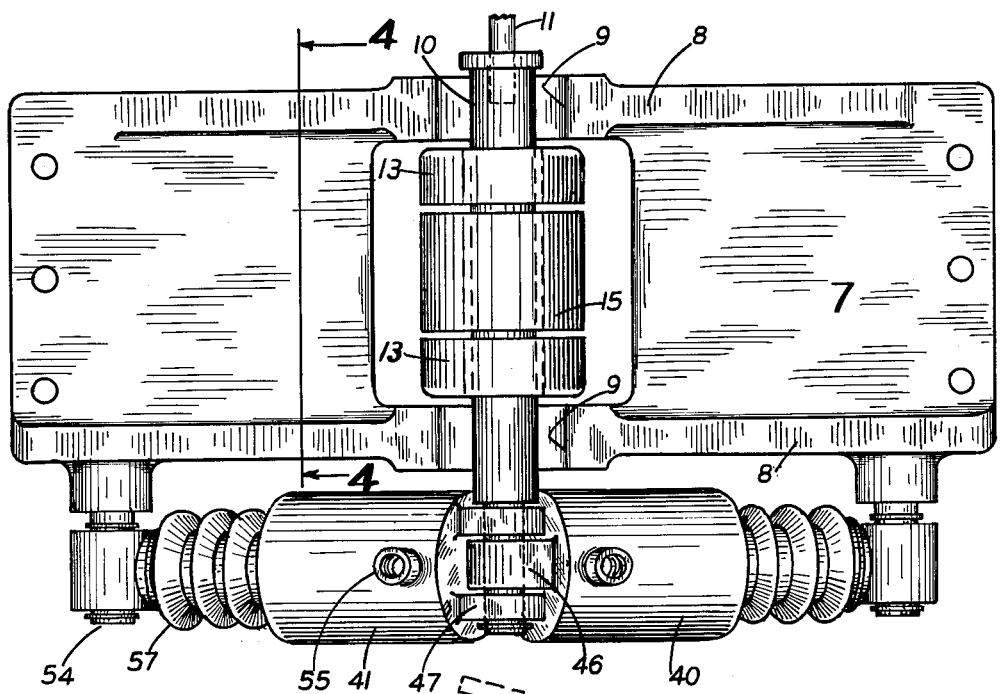
Fig. 2 is an enlarged detail of one support member for a fifth wheel mount according to the invention.

The device illustrated provides a mounting for a fifth wheel, the term commonly used for the mechanism for supporting a semi-trailer on the frame of a tractor. As shown in Fig. 1, the device is mounted on longitudinal stringers 1 and 2 of a frame of a tractor, having a lateral support 3, only one such support is illustrated for clarity of the drawings. The wheels 4 of the tractor are mounted in conventional manner on a differential (not shown) and through a spring system (not shown) to the frame of the tractor. The tractor includes an operator's cab 5, partially shown by dashed lines. As is customary, the fifth wheel is centered on the springs of the tractor so that the weight of the trailer may be evenly distributed on the tractor springs and over the wheel axle. For this mounting arrangement, a pair of fifth wheel mounting brackets 7 are secured to the longitudinal stringers 1 and 2 above the springs of the tractor. The brackets 7 are secured to the stringers by conventional means, such as bolts and the like. The brackets 7, illustrated in detail in Fig. 2, include opposed upright sides 8 which terminate in an upper cradle 9, essentially centerwise of the bracket. A support shaft 10 is mounted in each bracket 7 and is positioned at each end in the cradles 9. The cradles 9 are wider than the diameter of the shaft 10 so as to permit forward and backward movement of the shaft 10. The two shafts 10 in the opposed brackets are secured together by means of a tie rod 11. The shafts 10 may be connected by a full diameter, integral tie rod, but the smaller rod 11 is satisfactory and it conserves weight. Each shaft 10 is mounted in a pivot link or upright rocker arm 12 which is pivotally secured in the walls 8 by a pin 14. The link 12 includes a bifurcated upper end 13 in which the shaft 10 is mounted, and a fifth wheel support bracket 15 is secured on the shaft 10 between the upper ends 13. Thus it is apparent that the link 12 permits pivoting movement of the shaft 10 about the pin 14, and the shaft 10 may move from the forward to the rearward wall of the cradle 9. This linking arrangement prevents twisting of the shaft in the cradle. A fifth wheel 19 (shown in dashed lines in Fig. 1) is mounted at each side thereof to the supports 15, providing spaced-apart supports for the fifth wheel.

A mechanical, electrical or fluid activating device for the brakes of the trailer may be interconnected with either of the shafts 10 or the tie rod 11 whereby movement of the shafts or the rod, due to the relative movement of the trailer and the tractor, may actuate the trailer brakes, as more fully set forth below. A connection to the tie rod is illustrated in Figs. 5 and 6. In this case an arm 20 (which is at least hollow at one end) is interconnected to the tie rod 11 by means of a pin 21 whereby movement of the tie rod causes axial reciprocating movement of the arm 20. An actuating rod 22 is reciprocally mounted in the hollow end portion of arm 20 with a fit which permits free reciprocal movement of the rod 22 in the arm 20. The rod 22 terminates in a bifurcated end 23 which forms a yoke for securing to a brake actuating member 24, only a part of which is shown, by means of a pivot pin 25. The actuating arm 24 may be connected to any convenient type of mechanism for actuating electric, fluid or mechanical brakes of the trailer on movement of the rod 11. A release 27 is pivotally mounted on the rod 22 by means of a pin 28. The release 27 is mounted in position to contact the end of the arm 20 so that on movement of rod 11 toward the pin 25, the arm 20 impinges on the release 27 to move the rod 22 in the direction of the actuating arm 24. Reverse movement of rod 11 moves arm 20 away from release 27 so that it slides over rod 22 without moving arm 24.

A release cable 30 mounted in a sheath 31 extends from release 27 into the operator's cab 5 where it terminates in a control button 33. This release system permits the operator to disengage the release 27 from contact with arm 20. In the released position the arm 20 is free to move reciprocally on the rod 22 without moving the brake actuating rod 24. This permits the operator to move the tractor and trailer without having the automatic braking mechanism actuate during such maneuvering, especially backing up. For example, in backing up the tractor and trailer, the trailer tends to override the tractor and the automatic brake mechanism must be disengaged to prevent actuating the trailer brakes.

In towing a trailer there is normally a continuous relative motion between the tractor and the trailer due to the variation of forces which act differently on each member. For example, under acceleration the tractor tends to pull away from the trailer since the trailer is a dead weight without motivated power, and on deceleration the inertia of the trailer tends to force the trailer to override the tractor. Normal driving causes a substantially continuous push or pull between the members. There are, also, monetary differential forces due to bumps, rises, dips and the like in any road. Thus, when the tractor tends to pull away from the trailer, the shafts 10 are moved to the trailer side of the cradle 9, and when the trailer tends to override the tractor, the shafts 10 tend to move the tractor side of the cradle 9. When the release 27 is in arm 20 contacting position, arm 24 is moved, activating the trailer brakes tending to prevent the trailer from overriding the tractor.

To prevent operation of the brakes due to momentary movement of the shafts 10 due to rough road conditions and the like and to provide parallel and equal movement of both shafts in the cradles, that is, to have the left shaft 10 move equally with the right shaft, a retarding system is provided. This retarding system prevents operation of the brake mechanism except for a sustained force such as caused by a sustained push of the trailer against the tractor, moving the shaft 10 forward. The retarding force illustrated includes a system of four retarding devices, in the nature of four dashpots, connected in opposed pairs on the outer ends of the shafts 10. The dashpots may be cylinder and piston combinations mounted on the shafts and interconnected in such a manner as to ensure equal movement of both shafts in their cradles. As shown, Figs. 1-3, dashpots 40 and 41 are mounted on the end of the right shaft 10. In this case the cylinders are interconnected to shaft 10, and the pistons interconnected to the frame. The dashpot 40 is provided with an eye 46 mounted on shaft 10, the dashpot 41 is provided with a yoke 47 which is mounted on the shaft 10 and which straddles the eye 46. The opposed shaft 10 has mounted dashpots 42 and 43 mounted thereon in essentially the same manner, with dashpot 43 provided with a yoke 49, and the dashpot 42 provided with an eye 48.

Figure 3:
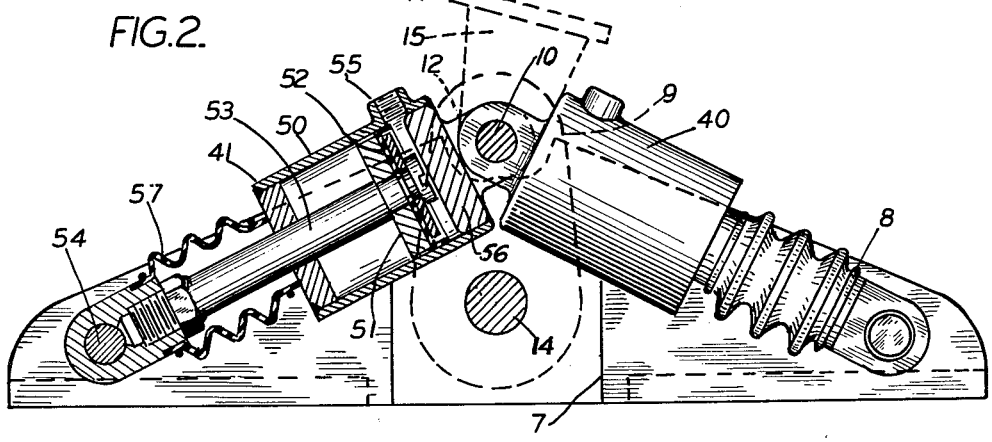
Fig. 3 is a side elevational view, in partial section, of the detail of Fig. 2.

Each dashpot is of similar construction and the sectional view of Fig. 3 will serve to illustrate the construction of all of the dashpots. In this case, a dashpot 41 includes a cylinder 50 having a piston 51 mounted for reciprocal movement therein. The piston is provided with a seal 52 for sealing the piston to the inside of the cylinder 50. The piston 51 is interconnected with a piston rod 53 which is pivotally mounted on a pin 54 mounted on support 7. A threaded inlet 55 for fluid communicates with the space between the piston and cylinder head 56. A bellows-type dust seal 57 encloses the piston rod and maintains it free from dust and dirt. The yoke 47 for shaft 10 is mounted on the cylinder head 56 so that the actual movement is movement of the cylinder over the piston. The inlet of dashpot 40 is interconnected with the inlet of dashpot 43, Fig. 1, while the inlet of dashpot 41 is interconnected with the inlet of dashpot 42. This provides a cross connection of dashpots on diagonally opposed sides of the fifth wheel support. A needle valve in the lines provides a control for the flow through the lines. In the line 61 between dashpots 40 and 43 a control valve 62 provides means for controlling the flow, while valve 63 controls flow in line 60 between dashpots 41 and 42. The line 60 extends beyond the dashpot 41, as by means of a T on the inlet to the dashpot 41, and it extends from line 64 to a fluid reservoir. Line 61 extends beyond the dashpot 40 as by means of a T mounted on the inlet and a line 65, also, interconnected with the reservoir.

A reservoir for maintaining the cylinders full is illustrated in Fig. 7 and it includes a cylinder 70 having a threaded head 71 secured at one end and a threaded bottom 72 secured to the opposite end. The bottom has a threaded outlet 73 into which is threaded a T member 74 having a ballcheck 75 therein. The lines 65 and 64 connect with the lines of the same number leading from the cylinders. A piston 76 having a gasket 77 is reciprocally mounted in the cylinder 70 providing a fluid chamber 78. The piston is maintained under spring pressure by means of a helical spring 79 mounted between the piston and the head 71. A passage 80 in piston rod 81 provides means for filling the cylinder and provides air pressure if necessary. Spring pressure against the piston maintains fluid under pressure, and forces it into the dashpots or interconnecting lines in the event they are not completely full.

In operation, movement of the shafts forwardly or rearwardly of the cradles causes cross feeding of fluid in the dashpots so that the shafts move equally. Thus if pressure is exerted on the side of the fifth wheel forcing it against dashpot 41, fluid passes in line 60 into dashpot 42 causing the shaft on that side to move equally with shaft 10 on the first side. This movement is against fluid pressure in dashpot 43, and fluid is forced from it into dashpot 40. This provides a cushioning effect. On rearward relative movement of the trailer a reverse flow of fluid and movement occurs. Thus momentary forces are absorbed by the system, but sustained forces permits movement of rod 11 and actuation of the brake mechanism when the movement of the trailer is forward in respect to the tractor.

While the invention has been illustrated by reference to a specific embodiment, there is no intent to limit the scope or spirit of the invention to the precise details so set forth, expect as defined in the following claims.

I claim:

1. A mount for a fifth wheel for mounting on a tractor for supporting semi-trailers and the like, comprising a pair of supports arranged to be carried on a tractor frame, an upright rocker arm pivotally mounted on each said support, a shaft mounted adjacent its ends in said rocker arms and supported to pivot forwardly and rearwardly relative to the supports in response to differential movement between a tractor and semi-trailer, stop means on each said support for limiting forward and rearward pivotal movement of said shaft, means mounted on opposed ends of said shaft and carried by said frame for maintaining parallel movement of both ends thereof in said supports, and means interconnecting said shaft and a brake system for activating the same on pivotal movement of said shaft.

2. A mount for a fifth wheel for mounting on a tractor for supporting semi-trailers and the like, comprising a pair of spaced-apart supports arranged to be carried on a tractor frame, an upright rocker arm pivotally mounted on each said support, a shaft mounted adjacent its ends in said rocker arms and supported to pivot forwardly and rearwardly relative to the supports in response to differential movement between a tractor and semi-trailer, stop means on each said support for limiting forward and rearward pivotal movement of said shaft, means mounted on opposed ends of said shaft and carried by said frame for maintaining parallel movement of both ends thereof in said supports, and means interconnecting said shaft and a brake system for activating the same on pivotal movement of said shaft.

3. A mount for a fifth wheel for mounting on a tractor for supporting semi-trailers and the like, comprising a pair of spaced-apart supports arranged to be carried on a tractor frame, an upright rocker arm pivotally mounted on each said support, a shaft rotatably mounted adjacent its ends in said rocked arms and supported to pivot forwardly and rearwardly relative to the supports in response to differential movement between a tractor and semi-trailer, means mounted on said shaft adjacent the ends thereof supporting a fifth wheel, stop means on each said support for limiting forward and rearward pivotal movement of said shaft, means mounted on opposed ends of said shaft and carried by said frame for maintaining parallel movement of both ends thereof in said supports, and means interconnecting said shaft and a brake system for activating the same on pivotal movement of said shaft.

4. A mount for a fifth wheel for mounting on a tractor for supporting semi-trailers and the like, comprising a pair of spaced-apart supports arranged to be carried on a tractor frame, a pivot link having a bifurcated upper end pivotally mounted on each said support, a shaft rotatably mounted adjacent its ends in the bifurcated ends of said pivot links whereby said shaft is supported at four positions, said shaft being arranged to pivot forwardly and rearwardly relative to the supports in response to differential movement between a tractor and semi-trailer, stop means on each said support for limiting pivotal movement of said shaft, means mounted on opposed ends of said shaft and supported by said frame for maintaining parallel movement of both ends of said shaft in said supports, and means interconnecting said shaft and a brake system for activating the same on pivotal movement of said shaft.

5. A mount for a fifth wheel for mounting on a tractor for supporting semi-trailers and the like, comprising a pair of supports arranged to be carried on a tractor frame, a pivotal link inclusive of cradle means pivotally mounted on each said support, a shaft mounted adjacent its ends in said cradle means and supported to pivot forwardly and rearwardly relative to the supports in response to differential movement between a tractor and semi-trailer, stop means on each said support for limiting forward and rearward movement of said shaft, means including shaft retarding mechanism mounted on opposed ends of said shaft and supported on said frame and cooperatively interacting for maintaining parallel movement of both ends thereof in said supports, and means interconnecting said shaft and a brake system for activating the same on pivotal movement of said shaft.

6. A fifth wheel mount for mounting on a tractor for supporting semi-trailers and the like, comprising a pair of supports arranged to be mounted on a tractor frame, an upright rocker arm pivotally mounted on each said support, a shaft mounted adjacent its ends in said rocker arms and supported to pivot forwardly and rearwardly relative to the supports in response to differential movement between a tractor and semi-trailer, said shaft being arranged to support a fifth wheel, stop means on each said support for limiting forward and rearward pivotal movement of said shaft, means inclusive of opposed dashpots interconnected on each end of said shaft and cooperatively interacting whereby the ends of said shaft pivotally move through the same plane on said rocker arms and means interconnecting said shaft and a brake system for activating the same on pivotal movement of said shaft.

7. A fifth wheel mount for mounting on a tractor to support a semi-trailer and the like, comprising a pair of spaced-apart supports arranged to be carried on a tractor frame, an upright rocker arm pivotally mounted on each said support, a shaft mounted adjacent its ends in said rocker arms and supported to pivot forwardly and rearwardly relative to the supports in response to differential movements between a tractor and semi-trailer, said shaft being arranged to support a fifth wheel at spaced-apart locations, stop means on each said support for limiting forward and rearward pivotal movement of said shaft, means inclusive of opposed dashpots interconnected to each end of said shaft and cooperatively interacting whereby the ends of said shaft pivot through a common plane on said rocker arms and means interconnecting said shaft and a brake system for activating the same on pivotal movement of said shaft.

8. A fifth wheel mount for mounting on a tractor to support a semi-trailer and the like, comprising a pair of spaced-apart supports arranged to be carried on a tractor frame, an upright rocker arm pivotally mounted on each said support, a shaft mounted adjacent its ends in said rocker arms and supported to pivot forwardly and rearwardly relative to the supports in response to differential movements between a tractor and semi-trailer, said shaft being arranged to support a fifth wheel at spaced-apart locations, stop means on each said support for limiting forward and rearward pivotal movement of said shaft, means inclusive of opposed dashpots on each end of said shaft, the fluid lines of each said dashpot being cross connected to the diagonally opposed dashpot whereby the ends of said shaft pivot in parallel motion through substantially the same plane in said supports, and means interconnecting said shaft and a brake system for activating the same on pivotal movement of said shaft.

9. A fifth wheel mount for mounting on a tractor for support of a semi-trailer and the like, comprising a pair of supports arranged to be carried on a tractor frame, a pivot link inclusive of cradle means pivotally mounted on each said support, a shaft mounted adjacent its ends in said cradle means and supported to move forwardly and rearwardly relative to the supports in response to differential movement between a tractor and semi-trailer, said shaft being arranged to support a fifth wheel, stop means on each said support for limiting forward and rearward pivotal movement of said shaft, means inclusive of opposed dashpots on each end of said shaft, the fluid lines of each said dashpot being cross connected to the diagonally opposed dashpot whereby the ends of said shaft pivot in substantially parallel motion through substantially the same plane in said supports, a fluid reservoir interconnected with each said fluid line to maintain the same full of fluid under pressure, and means interconnecting said shaft and a braking system for activating the same on pivotal movement of said shaft.

10. A fifth wheel mount for mounting on a tractor for supporting a semi-trailer and the like, comprising a pair of spaced-apart supports arranged to be carried on a tractor frame, an upright rocker arm pivotally mounted on each said support, a shaft mounted adjacent its ends in said rocker arms and supported to pivot forwardly and rearwardly relative to the supports in response to differential movement between a tractor and semi-trailer, said shaft adapted to support a fifth wheel, stop means on each said support for limiting forward and rearward pivotal movement of said shaft, means inclusive of opposed dashpots secured to each end of said shaft and said support, the fluid lines of each said dashpot being cross connected to the diagonally opposed dashpot whereby the ends of said shaft pivot in parallel motion through substantially the same plane in said supports, valve means for selectively controlling fluid flow through said lines for selectively retarding pivotal movement of said shaft, and means interconnecting said shaft and a brake system for activating the same on pivotal movement of said shaft.

References Cited in the file of this patent

UNITED STATES PATENTS

| | | |
|---|---|---|
| 1,316,661 | Winn | Sept. 23, 1919 |
| 1,660,946 | Winn | Feb. 28, 1928 |
| 2,123,820 | Winn | July 12, 1938 |
| 2,188,727 | Soulis | Jan. 30, 1940 |
| 2,232,897 | Winn | Feb. 25, 1941 |